US012425775B2

(12) United States Patent
Terada et al.

(10) Patent No.: US 12,425,775 B2
(45) Date of Patent: Sep. 23, 2025

(54) MAGNETIC CIRCUIT FOR ACOUSTIC TRANSDUCER, AND SPEAKER UNIT

(71) Applicant: YAMAHA CORPORATION, Hamamatsu (JP)

(72) Inventors: Takahiro Terada, Hamamatsu (JP); Yukio Wakui, Iwata (JP); Tsunenori Sano, Hamamatsu (JP); Masao Noro, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 214 days.

(21) Appl. No.: 18/463,366

(22) Filed: Sep. 8, 2023

(65) Prior Publication Data

US 2023/0421962 A1 Dec. 28, 2023

Related U.S. Application Data

(63) Continuation of application No. PCT/JP2022/009245, filed on Mar. 3, 2022.

(30) Foreign Application Priority Data

Mar. 9, 2021 (JP) ................................ 2021-037777

(51) Int. Cl.
*H04R 9/02* (2006.01)
*H01F 7/08* (2006.01)

(52) U.S. Cl.
CPC ............ *H04R 9/025* (2013.01); *H01F 7/081* (2013.01)

(58) Field of Classification Search
CPC .. H04R 9/025; H04R 7/127; H04R 2209/024; H04R 31/00; H04R 9/06; H01F 7/081; H01F 7/0289; H01F 7/066
See application file for complete search history.

(56) References Cited

U.S. PATENT DOCUMENTS

2014/0348374 A1 11/2014 Kuze et al.

FOREIGN PATENT DOCUMENTS

JP H0560317 A 3/1993
WO 2013140719 A1 9/2013

OTHER PUBLICATIONS

International Search Report issued in Intl. Appln. No. PCT/JP2022/009245 mailed May 31, 2022. English translation provided.

(Continued)

*Primary Examiner* — Tuan D Nguyen
(74) *Attorney, Agent, or Firm* — ROSSI, KIMMS & McDOWELL LLP

(57) ABSTRACT

An object of the present invention is to provide a magnetic circuit for an acoustic transducer, the magnetic circuit enabling peeling of the surface of a member formed by compression-molding a soft magnetic composite material to be suppressed. The present invention is a magnetic circuit for an acoustic transducer, the magnetic circuit including: a yoke 151; a magnet 152; and a top plate 153, wherein the yoke 151 includes a bottom surface portion 151*a* and a pole piece 151*b* provided perpendicular to the bottom surface portion 151*a*, the magnet 152 and the top plate 153 are provided in that order on the bottom surface portion 151*a*, a magnetic gap 141 in which a voice coil 14 is disposed is formed between the pole piece 151*b* and the top plate 153, at least one of the pole piece 151*b* and the top plate 153 includes: a composite material part 154 in a position facing the magnetic gap 141; and a protective layer 155 covering at least a surface of the composite material part 154, the composite material part 154 is formed from a soft magnetic composite material, and the material of the protective layer 155 differs from the soft magnetic composite material.

6 Claims, 3 Drawing Sheets

(56) References Cited

OTHER PUBLICATIONS

Written Opinion issued in Intl. Appln. No. PCT/JP2022/009245 mailed May 31, 2022.

MAGNETIC CIRCUIT FOR ACOUSTIC TRANSDUCER, AND SPEAKER UNIT

TECHNICAL FIELD

The present invention relates to a magnetic circuit for an acoustic transducer, and a speaker unit. The present application claims priority to Japanese Patent Application No. 2021-37777, published on 9 Mar. 2021, the content disclosed in this Japanese application being incorporated herein in its entirety by reference.

BACKGROUND ART

A device that converts an electrical signal into sound is provided with a magnetic circuit. In a known technique, the occurrence of eddy currents in the magnetic circuit is suppressed by using, as a magnetic material used in the magnetic circuit, a soft magnetic composite material formed by coating and insulating the surface of a ferromagnetic powder.

PTL 1 describes a magnetic circuit for a speaker, the magnetic circuit including a magnet and upper and lower plates sandwiching the magnet. In PTL 1, a reduction in the weight of the magnetic circuit for a speaker can be achieved by forming at least one of the upper plate and the lower plate using a method of injection-molding a magnetic powder coated with resin (WO 2013/140719).

PTL 2 describes a magnetic circuit for an acoustic transducer, the magnetic circuit using, as a member forming a gap into which a voice coil is inserted, a sintered metal formed by coating the surface of iron powder with copper, which is a non-magnetic metal having higher electrical conductivity than the iron powder, and sintering the result (Japanese Unexamined Patent Application Publication No. H05-60317). This magnetic circuit includes a magnet, a top plate, and a yoke having a pole piece that opposes the top plate with a gap into which the voice coil is inserted therebetween, and at least the opposing parts of the top plate and the pole piece are formed from the sintered metal.

CITATION LIST

Patent Literature

[PTL 1] WO 2013/140719
[PTL 2] Japanese Unexamined Patent Application Publication No. H05-60317

SUMMARY OF INVENTION

Technical Problem

On either the upper plate or the lower plate of PTL 1, the magnetic powder is coated with resin, and therefore the upper plate or the lower plate cannot be formed by being sintered at a high temperature. The upper plate or the lower plate is therefore fragile, and as a result, the surface thereof may peel due to a strong magnetic field generated in the magnetic gap.

In the sintered metal of PTL 2, a magnetic powder material such as iron is coated with a non-magnetic metal, and therefore the individual magnetic powder particles are short-ringed so as to cancel out alternating magnetic flux generated by a voice current flowing through the voice coil, whereby it is disclosed that a reduction in current distortion can be achieved. However, a problem exists in that in the sintered metal, the iron powder particles are respectively coated with the non-magnetic metal, leading to an increase in the proportion of non-magnetic metal in the sintered metal as a whole, and as a result, the magnetic flux density decreases.

In consideration of the circumstances described above, an object of the present invention is to provide a magnetic circuit for an acoustic transducer, the magnetic circuit enabling peeling of the surface of a member formed by compression-molding a soft magnetic composite material to be suppressed.

Solution to Problem

The present invention, which has been designed to solve the problems described above, is a magnetic circuit for an acoustic transducer, the magnetic circuit including: a yoke; a magnet; and a top plate, wherein the yoke includes a bottom surface portion and a pole piece provided perpendicular to the bottom surface portion, the magnet and the top plate are provided in that order on the bottom surface portion, a magnetic gap in which a voice coil is disposed is formed between the pole piece and the top plate, at least one of the pole piece and the top plate includes: a composite material part in a position facing the magnetic gap; and a protective layer covering at least a surface of the composite material part, the composite material part is formed from a soft magnetic composite material, and the material of the protective layer differs from the soft magnetic composite material.

The material of the protective layer is preferably a non-magnetic material.

The average thickness of the protective layer is preferably no more than 200 μm.

The protective layer preferably covers the entire surface of each member, of the pole piece and the top plate, that includes the composite material part.

The soft magnetic composite material preferably contains a magnetic powder, a surface of which is coated with a phosphoric acid-based chemical conversion coating or a silicone resin coating.

DESCRIPTION OF EMBODIMENTS

Embodiments of the present invention will be described in detail below with appropriate reference to the figures.

First Embodiment

A speaker 1 will be described below as an embodiment of an acoustic transducer including a magnetic circuit for an acoustic transducer (also referred to simply as a "magnetic circuit" hereinafter) of the present invention.

<Speaker>

Figure 1:
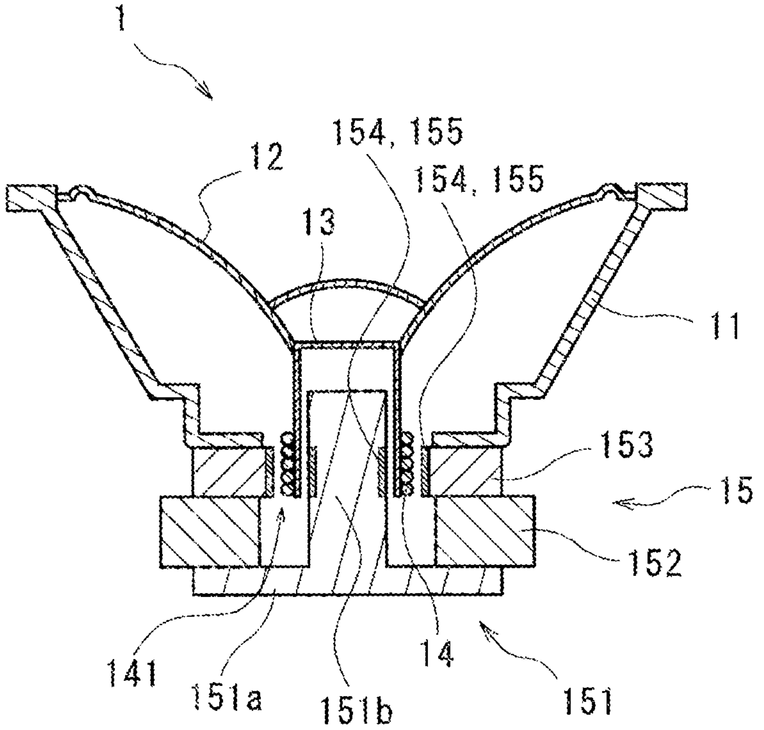
FIG. 1 is a schematic end view showing a speaker including a magnetic circuit for an acoustic transducer according to an embodiment of the present invention.

FIG. 1 is a schematic end view of the speaker 1. The speaker 1 mainly includes: a substantially conical frame 11;

a diaphragm 12, the outer periphery of which is fixed to the frame 11; a bobbin 13 connected to substantially the center of the diaphragm 12; a voice coil 14 wound around the bobbin 13; and a magnetic circuit 15. In the speaker 1, the bobbin 13 and the diaphragm 12 are moved at a desired amplitude by attractive force and repulsive force generated between magnetic flux that is generated by passing a current through the voice coil 14 and magnetic flux from the magnetic circuit 15. As a result of this movement of the diaphragm, air vibrates such that sound is generated.

There are no specific limitations on the frame 11, the diaphragm 12, the bobbin 13, and the voice coil 14, and these components can be configured using well-known techniques.

[Magnetic Circuit]

The magnetic circuit 15 includes a yoke 151, a magnet 152, and a top plate 153. The yoke 151 includes a bottom surface portion 151*a*, and a pole piece 151*b* provided substantially perpendicular to the bottom surface portion 151*a*. The magnet 152 and the top plate 153 are provided in that order on the bottom surface portion 151*a*. In other words, the magnetic circuit 15 is formed by layering the bottom surface portion 151*a*, the magnet 152, and the top plate 153 from the bottom upward. A magnetic gap 141 in which the voice coil 14 is disposed is formed between the pole piece 151*b* and the top plate 153.

More specifically, the yoke 151 includes, for example: the substantially disc-shaped bottom surface portion 151*a*, and the columnar pole piece 151*b*, which is substantially column-shaped and is provided substantially in the center of the bottom surface portion 151*a* so that a longitudinal direction thereof is perpendicular to an upper surface (the surface on the side where the bobbin 13 is provided) of the bottom surface portion 151*a*. The bottom surface portion 151*a* and the pole piece 151*b* may be formed integrally or formed individually and joined. The magnet 152 and the top plate 153 are, for example, substantially disc-shaped and each has a through hole in a central portion thereof, the magnet 152 being disposed on the upper surface of the bottom surface portion 151*a* and the top plate 153 being provided on the magnet 152. The pole piece 151*b* penetrates the through holes.

In this embodiment, as shown in FIG. 1, each of the pole piece 151*b* and the top plate 153 includes a composite material part 154 and a protective layer 155. Alternatively, one of either the pole piece 151*b* or the top plate 153 may include: the composite material part 154 in a position facing the magnetic gap 141; and the protective layer 155 covering at least the surface of the composite material part 154.

Figure 2:
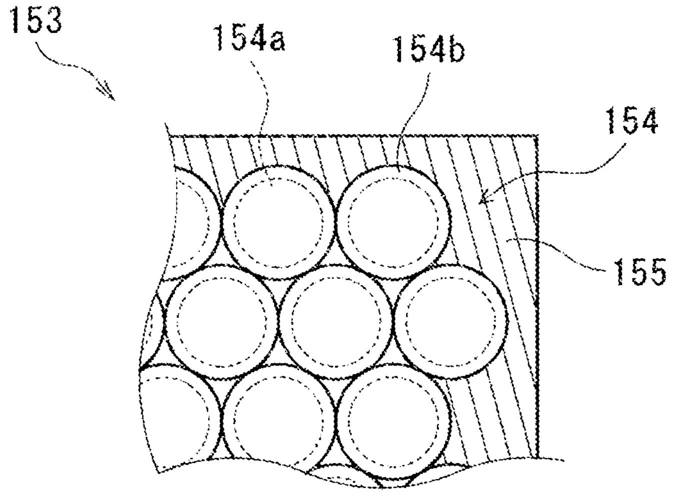
FIG. 2 is a schematic sectional view showing a partial enlargement of a top plate shown in FIG. 1.

As shown in FIG. 2, the protective layer 155 covers at least the surface of the composite material part 154. The composite material part 154 is formed from a soft magnetic composite material.

The protective layer 155 infiltrates at least gaps in the soft magnetic composite material on the surface of the composite material part 154. Thus, the protective layer 155 improves the binding force of the soft magnetic composite material on the surface, and as a result, peeling of the surface can be suppressed.

The magnetic gap 141 in which the voice coil 14 is disposed is a gap between the protective layer 155 of the pole piece 151*b* and the protective layer 155 of the top plate 153. The remaining parts of the pole piece 151*b* and the top plate 153 other than the composite material part 154 are formed by casting a metal such as iron, or the like. Alternatively, the entire pole piece 151*b*, the entire yoke 151 including the pole piece 151*b*, or the entire top plate 153 may be formed from the composite material part 154.

(Composite Material Part)

The composite material part 154 is formed by compression-molding a soft magnetic composite material in which a magnetic powder 154*a* is coated with a non-magnetic material. When a soft magnetic composite material is compression-molded such that the density thereof increases, eddy currents caused by variation in the current of the voice coil 14 can be suppressed, and as a result, electrical distortion can be suppressed. Note that since a non-magnetic material is also used for the protective layer 155, to be described below, the non-magnetic material used for the composite material part 154 will also be referred to as the "powder-use non-magnetic material".

(Magnetic Powder)

As long as the material of the magnetic powder 154*a* is a magnetic material, there are no specific limitations thereon, and as well as pure iron, a powdered iron-based alloy such as a Fe—Al alloy, a Fe—Si alloy, permalloy, or Sendust, for example, can be used. There are no specific limitations on the average particle size of the magnetic powder 154*a*, but no less than 50 μm and no more than 150 μm is preferable. Note that the "average particle size" refers to the particle diameter at which the cumulative particle size distribution reaches 50% within a particle size distribution evaluated using a sifting method.

(Powder-Use Non-Magnetic Material)

The powder-use non-magnetic material preferably includes a phosphoric acid-based chemical conversion coating or a silicone resin coating. By coating the individual particles of the magnetic powder 154*a* with the aforesaid phosphoric acid-based chemical conversion coating or silicone resin coating, electrical insulation between the particles of the magnetic powder 154*a* can be secured, and as a result, the aforementioned eddy currents can be further suppressed. As the thickness of the powder-use non-magnetic material coating the magnetic powder 154*a*, in order to suppress a reduction in the magnetic flux density, no more than 250 μm is preferable.

The phosphoric acid-based chemical conversion coating preferably contains at least one of Co (cobalt), Na (sodium), S (sulfur), W (tungsten), Si (silicon), Mg (magnesium), and B (boron). By including these elements, the heat resistance of the phosphoric acid-based chemical conversion coating can be improved and the electrical insulating property of the phosphoric acid-based chemical conversion coating can be maintained.

As the thickness of the phosphoric acid-based chemical conversion coating, no less than 1 nm and no more than 250 nm is preferable. When the thickness of the phosphoric acid-based chemical conversion coating does not satisfy the above lower limit value, it may not be possible to realize a sufficient electrical insulating property. When the thickness of the phosphoric acid-based chemical conversion coating exceeds the above upper limit value, it may become difficult to compression-mold the soft magnetic composite material to a high density.

The magnetic powder 154*a* coated with the phosphoric acid-based chemical conversion coating is acquired by, for example, mixing together the magnetic powder and a processing solution obtained by dissolving a compound containing desired elements in a solvent having orthophosphoric acid ($H_3PO_4$) as the main component, and then drying the mixture.

There are no specific limitations on the silicone resin of the silicone resin coating, and a well-known silicone resin can be used. The magnetic powder 154*a* coated with the silicone resin coating is acquired by, for example, mixing together iron powder and a solution of silicone resin dissolved in a petroleum-based organic solvent such as toluene, and then volatilizing the solution. Following volatilization, the magnetic powder coated with the silicone resin coating is preferably heated in order to pre-cure the silicone resin coating.

As the thickness of the silicone resin coating, no less than 1 nm and no more than 200 nm is preferable. When the thickness of the silicone resin coating does not satisfy the above lower limit value, it may not be possible to realize a sufficient electrical insulating property. When the thickness of the silicone resin coating exceeds the above upper limit value, it may become difficult to compression-mold the soft magnetic composite material to a high density.

The non-magnetic material may include both the phosphoric acid-based chemical conversion coating and the silicone resin coating. When the non-magnetic material includes both the phosphoric acid-based chemical conversion coating and the silicone resin coating, it is preferable to form the phosphoric acid-based chemical conversion coating on the magnetic powder 154*a* and form the silicone resin coating on the phosphoric acid-based chemical conversion coating. In so doing, electrical insulation is secured between the particles of the magnetic powder 154*a* by the phosphoric acid-based chemical conversion coating on the inside, and at the same time, the silicone resin coating on the outside functions as an adhesive for adhering the soft magnetic composite material together, with the result that the mechanical strength of the compression-molded soft magnetic composite material can be improved. As an upper limit value of the thickness of the non-magnetic material including both the phosphoric acid-based chemical conversion coating and the silicone resin coating, 250 nm is preferable.

(Protective Layer)

The material of the protective layer 155 differs from that of the composite material part 154. The composite material part 154 formed by compression-molding the soft magnetic composite material uses the powder-use non-magnetic material described above, and therefore the composite material part 154 cannot be sintered at a high temperature and is comparatively fragile. Accordingly, the surface of the composite material part 154 may peel due in particular to the strong magnetic field generated in and around the magnetic gap 141. The protective layer 155 covers the surface of the composite material part 154 and suppresses peeling of the composite material part 154.

The material of the protective layer 155 is preferably a non-magnetic material. Thus, the protective layer 155 can suppress peeling of the composite material part 154 without being affected by a magnetic field generated from the composite material part 154. Note that in order to distinguish the non-magnetic material used for the protective layer from the non-magnetic material used for the composite material part, the non-magnetic material used for the protective layer will also be referred to as the "protective layer-use non-magnetic material".

As the protective layer-use non-magnetic material, a silicone-based resin, a non-magnetic metal, or the like can be used, but in order to further suppress eddy currents, a non-magnetic metal is preferably used. As the non-magnetic metal, copper, silver, and so on, which have higher electrical conductivity than the electrical conductivity of the soft magnetic composite material, are preferable, and among these metals, copper is preferable. By using copper as the material of the protective layer 155, eddy currents from members including the composite material part 154 can be further suppressed, and as a result, the aforementioned electrical distortion can be effectively reduced. Moreover, impedance in the high-frequency domain can be suppressed, enabling an improvement in the sound pressure in the high-frequency domain.

By increasing the thickness of the protective layer 155, the aforementioned eddy currents can be further reduced. When the composite material part 154 is formed by coating the individual particles of the magnetic powder 154*a* with the powder-use non-magnetic material described above, the distances between the particles of the magnetic powder 154*a* are increased by the powder-use non-magnetic material, leading to a reduction in the proportion of iron in the composite material part 154, and as a result, the magnetic flux density in the magnetic gap 141 may decrease. The protective layer 155 of the magnetic circuit 15 coats the surface of the composite material part 154, and therefore the thickness can be made comparatively large without increasing the distances between the particles of the magnetic powder 154*a*. By increasing the thickness of the protective layer 155, the magnetic flux density in the magnetic gap 141 can be increased while further reducing the aforementioned eddy currents.

The average thickness of the protective layer 155 is preferably no more than 200 μm, and in order to more effectively suppress a reduction in the magnetic flux density, the average thickness is more preferably no more than 100 μm. When the average thickness of the protective layer 155 exceeds the above upper limit value, the distance between the soft magnetic materials in the magnetic gap increases, and as a result, the magnetic flux density in the magnetic gap may decrease. There are no specific limitations on a lower limit value of the average thickness of the protective layer 155, but for example, 1 μm is preferable, 3 μm is more preferable, and 5 μm is even more preferable. When the average thickness of the protective layer 155 does not satisfy this lower limit value, it may not be possible to effectively suppress peeling of the surface of the composite material part 154. Also, it may not be possible to effectively reduce the aforementioned eddy currents, and as a result, it may not be possible to secure a sufficient magnetic flux density. Note that the average thickness of the protective layer refers to an average value of the thickness of the protective layer measured at 10 arbitrary points.

The protective layer 155 preferably coats the entire surface of each member, of the pole piece 151*b* and top plate 153, that includes the composite material part 154. In other words, the protective layer 155 preferably coats not only the surface of the composite material part 154 but the entire surface of the pole piece 151*b* including the composite material part 154, and the entire surface of the top plate 153 including the composite material part 154. Thus, the aforementioned eddy currents can be further reduced.

Advantages

In the magnetic circuit for an acoustic transducer described above, the pole piece of the yoke or the top plate includes the composite material part and the protective layer, which are formed from a soft magnetic composite material, in positions facing the magnetic gap. Thus, the eddy currents that are generated near the magnetic gap can be reduced, whereby distortion in the current of the voice coil can be suppressed, and as a result, distortion in the sound reproduced by the acoustic transducer can be reduced. Furthermore, the magnetic circuit for an acoustic transducer includes the protective layer that covers at least the surface of the composite material part and is formed from a non-magnetic material. As a result, peeling of the surface of the composite material part can be suppressed.

Second Embodiment

A magnetic circuit for a headphone driver is given as another embodiment of the present invention. The headphones include, for example: a headband that is mounted on the head of the user; and a pair of headphone bodies provided on the headband together with ear pads. The headphone driver is built into each of the headphone bodies.

<Headphone Body>

Figure 3:
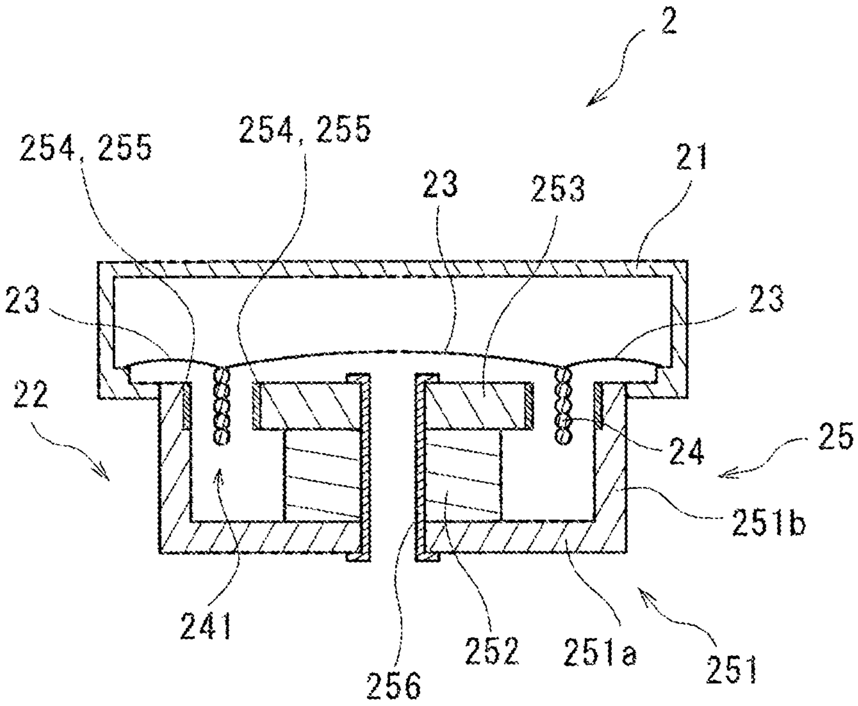
FIG. 3 is a schematic sectional view showing a headphone body according to another embodiment of the present invention.

FIG. 3 is a schematic sectional view of a headphone body 2. The headphone body 2 mainly includes a protector 21 to which the ear pad is attached, and a headphone driver 22. The headphone driver 22 includes: a diaphragm 23, the outer periphery of which is fixed to the protector 21; a voice coil 24 connected to the diaphragm 23; and a magnetic circuit 25. In the headphone driver 22, the diaphragm 23 is moved at a desired amplitude by attractive force and repulsive force generated between magnetic flux that is generated by passing a current through the voice coil 24 and magnetic flux from the magnetic circuit 25. As a result of this movement, air vibrates such that sound is generated.

There are no specific limitations on the diaphragm. 23 and the voice coil 24, and these components can be configured using well-known techniques.

[Magnetic Circuit]

The magnetic circuit 25 includes a yoke 251, a magnet 252, and a top plate 253. The yoke 251 includes a bottom surface portion 251*a*, and a pole piece 251*b* provided perpendicular to the bottom surface portion 251*a*. The magnet 252 and the top plate 253 are provided in that order on the bottom surface portion 251*a*. The magnetic circuit 25 may also include a fixing member 256 for fixing the magnet 252 and the top plate 253 to the bottom surface portion 251*a*. A magnetic gap 241 in which the voice coil 24 is disposed is formed between the pole piece 251*b* and the top plate 253.

More specifically, the yoke 251 includes, for example: the substantially disc-shaped bottom surface portion 251*a*, which has a through hole in a central portion thereof; and the pole piece 251*b*, which is provided perpendicular to an outer peripheral edge portion of the bottom surface portion 251*a*. The bottom surface portion 251*a* and the pole piece 251*b* of the yoke 251 may be formed integrally or formed individually and joined. The magnet 252 and the top plate 253 are substantially disc-shaped and each have a through hole in a central portion thereof, for example, and are disposed so that a central axis of the through hole in the bottom surface portion and a central axis of the through hole in the magnet 252 and the top plate 253 overlap.

In this embodiment, as shown in FIG. 3, each of the pole piece 251*b* and the top plate 253 includes a composite material part 254 and a protective layer 255. Alternatively, one of either the pole piece 251*b* or the top plate 253 may include: the composite material part 254 in a position facing the magnetic gap 241; and the protective layer 255 covering at least the surface of the composite material part 254.

The protective layer 255 covers at least the surface of the composite material part 254. The composite material part 254 is formed from a soft magnetic composite material, and the material of the protective layer 255 differs from the soft magnetic composite material.

The surface of the composite material part 254 is coated with the protective layer 255. The protective layer 255 infiltrates at least the gaps in the soft magnetic composite material on the surface of the composite material part 254. Thus, the protective layer 255 improves the binding force of the soft magnetic composite material on the surface, and as a result, peeling of the surface can be suppressed.

The material of the protective layer 255 is preferably a non-magnetic material. Thus, the protective layer 255 can suppress peeling of the composite material part without being affected by the magnetic field generated from the composite material part 254. As the protective layer-use non-magnetic metal, a non-magnetic metal is preferably used in order to further suppress eddy currents, and copper is preferable as the non-magnetic metal. By using copper as the material of the protective layer 255, the aforementioned eddy currents can be effectively suppressed, and as a result, the impedance in the high-frequency domain can be suppressed, enabling an improvement in the sound pressure in the high-frequency domain.

The magnetic gap 241 in which the voice coil 24 is disposed is a gap between the protective layer 255 of the pole piece 251*b* and the protective layer 255 of the top plate 253. The remaining parts of the pole piece 251*b* and the top plate 253 other than the composite material part 254 are formed by casting a metal such as iron, or the like. Alternatively, the entire pole piece 251*b*, the entire yoke 251 including the pole piece 251*b*, or the entire top plate 253 may be formed from the soft magnetic composite material described above.

The composite material part 254 and the protective layer 255 provided in the magnetic circuit 25 of the headphone driver 22 are configured similarly to the composite material part 154 and the protective layer 155 of the speaker 1.

Other Embodiments

The configuration of the present invention is not limited to the embodiments described above. Accordingly, in the embodiments described above, constituent elements of the respective parts of the embodiments may be omitted, replaced, or added to on the basis of the disclosure in the present specification and common technical knowledge, and all such modifications are to be interpreted as belonging to the scope of the present invention.

In the above embodiments, the yoke 151 of the speaker 1 is described as including the plate-shaped bottom surface portion 151*a* and the pole piece 151*b* positioned substantially in the center of the bottom surface portion 151*a*, but as long as the magnet 152 and the top plate 153 can be disposed on the bottom surface portion 151*a* and the magnetic gap 141 can be formed favorably between the pole piece 151*b* and the top plate 153, there are no specific limitations on the shape of the yoke 151.

Similarly with regard to the shape of the yoke 251 of the headphone driver 22, as long as the magnet 252 and the top plate 253 can be disposed on the bottom surface portion 251*a* and the magnetic gap 241 can be formed favorably between the pole piece 251*b* and the top plate 253, there are no specific limitations on the shape of the yoke 251.

INDUSTRIAL APPLICABILITY

As described above, the magnetic circuit for an acoustic transducer of the present invention is capable of suppressing peeling of the surface of the composite material part and achieving a reduction in eddy currents and can therefore be used favorably in an acoustic transducer having superior acoustic characteristics, such as a speaker or headphones.

REFERENCE SIGNS LIST

1 Speaker
11 Frame
12 Diaphragm
13 Bobbin
14 Voice coil
141 Magnetic gap
15 Magnetic circuit
151 Yoke
**151*a*** Bottom surface portion
**151*b*** Pole piece
152 Magnet
153 Top plate
154 Composite material part
**154*a*** Magnetic powder
**154*b*** Coating (phosphoric acid-based chemical conversion coating or silicone resin coating)
155 Protective layer
2 Headphone body
21 Protector
22 Headphone driver
23 Diaphragm
24 Voice coil
241 Magnetic gap
25 Magnetic circuit
251 Yoke
**251*a*** Bottom surface portion
**251*b*** Pole piece
252 Magnet
253 Top plate
254 Composite material part
255 Protective layer
256 Fixing member

The invention claimed is:

1. A magnetic circuit for an acoustic transducer, the magnetic circuit comprising:
a yoke;
a magnet; and
a top plate,
wherein the yoke includes a bottom surface portion and a pole piece provided perpendicular to the bottom surface portion,
the magnet and the top plate are provided in that order on the bottom surface portion,
a magnetic gap in which a voice coil is disposed is formed between the pole piece and the top plate,
at least one of the pole piece and the top plate includes: a composite material part in a position facing the magnetic gap; and a protective layer covering at least a surface of the composite material part,
the composite material part is formed from a soft magnetic composite material, and
a material of the protective layer differs from the soft magnetic composite material.

2. The magnetic circuit for an acoustic transducer according to claim 1, wherein the material of the protective layer is a non-magnetic material.

3. The magnetic circuit for an acoustic transducer according to claim 1, wherein an average thickness of the protective layer is no more than 200 μm.

4. The magnetic circuit for an acoustic transducer according to claim 1, wherein the protective layer covers an entire surface of each member, of the pole piece and the top plate, that includes the composite material part.

5. The magnetic circuit for an acoustic transducer according to claim 1, wherein the soft magnetic composite material contains a magnetic powder, a surface of which is coated with a phosphoric acid-based chemical conversion coating or a silicone resin coating.

6. A speaker unit comprising:
a frame;
a diaphragm, an outer periphery of which is fixed to the frame;
a bobbin that vibrates the diaphragm;
a voice coil wound around the bobbin; and
the magnetic circuit according to claim 1.

* * * * *